United States Patent [19]

Jacobs

[11] Patent Number: 4,591,938

[45] Date of Patent: May 27, 1986

[54] METHOD AND APPARATUS FOR REMOVAL OF DUST FROM AN INFORMATION CARRIER DURING RECORDING AND PLAYBACK

[75] Inventor: John H. Jacobs, Altadena, Calif.

[73] Assignee: Bell & Howell Company, Skokie, Ill.

[21] Appl. No.: 459,404

[22] Filed: Jan. 20, 1983

[51] Int. Cl.⁴ ............................................. G11B 00/00
[52] U.S. Cl. ..................................... 360/137; 360/102
[58] Field of Search ....................... 360/102, 103, 137; 369/72, 97

[56] References Cited

U.S. PATENT DOCUMENTS

| | | | |
|---|---|---|---|
| 1,859,597 | 5/1932 | Nason. | |
| 3,063,041 | 11/1962 | Quade et al. | 360/102 X |
| 3,712,703 | 1/1973 | Newdigate | 350/62 |
| 3,855,524 | 12/1974 | Crawford | 360/102 X |
| 3,961,372 | 6/1972 | Brock et al. | 360/102 |
| 4,358,802 | 11/1982 | Jarsen | 360/102 X |

OTHER PUBLICATIONS

IBM/TDB vol. 3, No. 12, May 1961, p. 6, "Pneumatic Drum" by Auyang.

*Primary Examiner*—John H. Wolff
*Attorney, Agent, or Firm*—Charles P. Sammut

[57] ABSTRACT

A method and apparatus for removing dust from an information carrier includes a rotating member having at least one channel extending therethrough, operative to act as a centrifugal pump, and also includes apparatus for recording or playback of information from the information carrier.

39 Claims, 3 Drawing Figures

METHOD AND APPARATUS FOR REMOVAL OF DUST FROM AN INFORMATION CARRIER DURING RECORDING AND PLAYBACK

CROSS REFERENCE TO RELATED APPLICATION

This application is related to the application entitled "INFORMATION RECORDING METHODS AND APPARATUS" filed by John H. Jacobs on Apr. 12, 1985, Ser. No. 06/722,200, a divisional application of U.S. patent application Ser. No. 06/459,440, filed Jan. 20, 1983, now abandoned.

BACKGROUND OF THE INVENTION

1. Field of the Invention

This invention relates generally to an information recording and playback method and apparatus and in particular to an information scanner which provides a flow of filtered air onto an information carrier to thereby remove dust from the information carrier.

2. Disclosure Statement

One of the problems in optical digital recording is the presence of dust particles on the information carrier which, by obstructing a light beam, may prevent the recording of portions of information, or may prevent the playback of previously recorded information.

Several configurations of optical scanners are disclosed by John H. Jacobs in the above cross-referenced U.S. patent application. These configurations show an optical scanner having at least one lens, where the scanner rotates adjacent to an information carrier which may be either stationary or moving. The axis of rotation of the scanner is substantially perpendicular to the information carrier.

Because of the size of each information unit in an optical digital information carrier, particles of dust may block out part or all of an information unit with the result of an error in playback of that information unit. Likewise during a recording process, a dust particle may prevent the recording of an information unit. None of the configurations in the above cross-referenced U.S. patent application provide means for removal of dust particles on the information carrier.

Accordingly, it is desirable to provide a method and apparatus for the removal of dust particles from an information carrier during recording and playback.

SUMMARY OF THE INVENTION

This invention is directed toward a method and apparatus for removing dust particles from an optical information carrier. In general, this is accomplished by utilizing an optical scanner in the form of a rotating member such as a disc. The disc contains at least one channel which has been bored into the disc such that as the disc rotates, the channel acts as a centrifugal pump, thereby causing air to flow through each channel and onto the information carrier. In addition, a filter may be added to each channel to remove dust particles from the air before the air strikes the information carrier. Alternatively, a single filter may be utilized to provide filtered air to more than one channel.

Many additional features and advantages of the invention including the adaptability of the invention to other types of information carriers, such as magnetic, will be apparent from a reading of the specification in which an illustrative embodiment of the invention is described in detail. This specification is to be taken with the accompanying drawing in which the various characteristics of the preferred embodiment are illustrated.

DESCRIPTION OF THE PREFERRED EMBODIMENT

Figure 1:
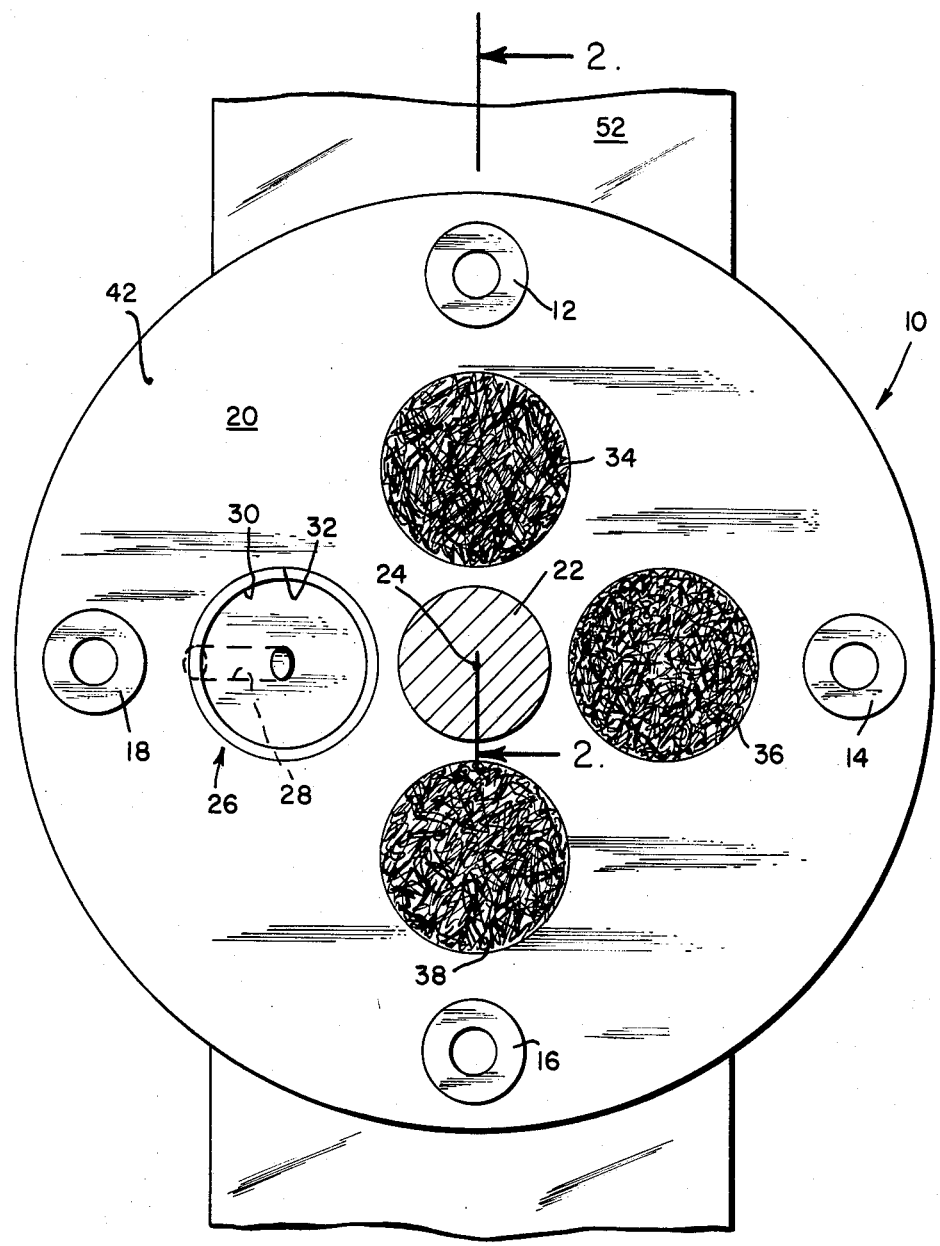
FIG. 1 is a top plan view of an apparatus embodying the present invention.

Referring to the drawing, FIG. 1 shows an optical scanner 10. The scanner consists of an optical beam focusing means, specifically a set of lens assemblies 12, 14, 16 and 18, mounted near the outer periphery of a disc 20. Although four lens assemblies are shown in FIG. 1, any number of lens assemblies may be utilized in practicing the invention. Furthermore, although the lens assemblies 12, 14, 16 and 18 are shown to be symmetrical with respect to each other, the lens assemblies may be arranged at any selected angle with respect to each other. In addition, although lens-assemblies are utilized, any other information handling element or transducer may be substituted for each lens assembly.

A shaft 22 is fixedly mounted to the disc 20 to thereby transfer rotational motion from an external drive means (not shown) to the disc 20. The disc 20 and the shaft 22 rotate about an axis 24.

Within the disc 20 is a set of four channels. It is to be understood that any number of channels may be utilized in practicing the invention. Referring to FIG. 1, a channel 26 is comprised of a bore 28, a plenum chamber 30 and a filter chamber 32. The cross-sectional area of the channel 26 increases in two steps such that the cross-sectional area of the plenum chamber 30 is larger than the cross-sectional bore 28, and the cross-sectional area of the filter chamber 32 is larger than the cross-sectional area of the plenum chamber 30.

Although not shown in FIG. 1, a channel extends from the top surface of a set of filters 34, 36 and 38 to the opposite side of the disc 20 as does the channel 26.

Figure 2:
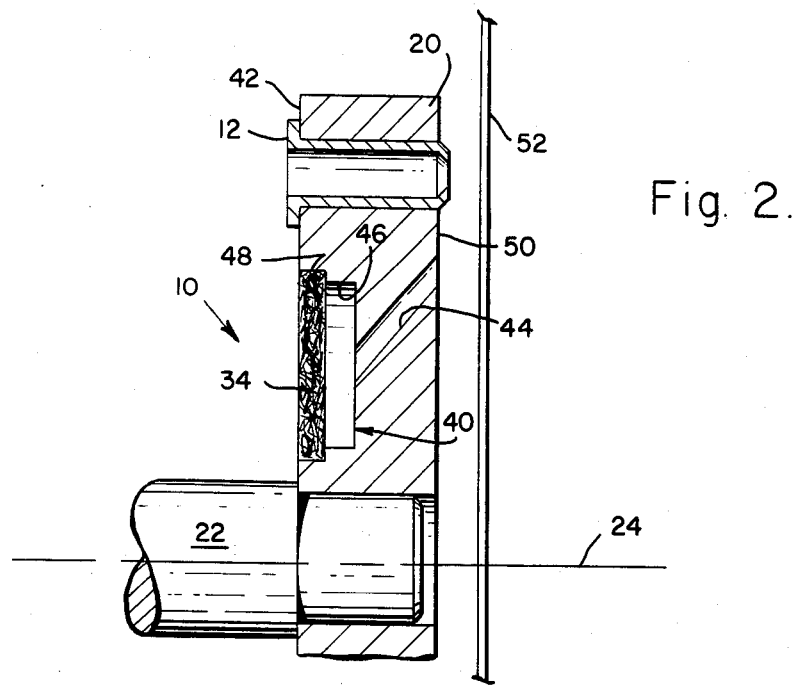
FIG. 2 is a fragmented side view of a section of the apparatus taken along line 2—2 of FIG. 1, illustrating one channel and one lens assembly.

Referring now to FIG. 2 the cross-sectional area of a channel 44 increases in two steps toward a first planar surface 42 of the disc 20 to thereby provide a bore 40, a plenum chamber 46 and a filter chamber 48. As shown in FIG. 2, the filter 34 is mounted within the filter chamber 48. The filter 34 may be secured with an adhesive or other suitable means. In the preferred embodiment of the invention a filter would be secured within the filter chamber 32. Such a filter is omitted in FIG. 1 for purposes of illustration.

The filter chamber 48 provides a passageway between the first planar surface 42 and the plenum chamber 46. The bore 44 provides a passageway between the plenum chamber 46 and a second planar surface 50 of the disc 20. Although FIG. 2 shows the outlet of the bore 44 adjacent to the end of the lens assembly 12 which is closest to an information carrier 52, that end of the bore 44 may be positioned away from that end of the lens assembly 12.

In operation, the shaft 22 is rotated by an external drive means (not shown) to thereby rotate the disc 20 about the axis 24. Referring to FIG. 2, because the end of bore 44 closest to the information carrier 52 is further from the axis 24, than is the center of the filter chamber 48, as the disc 20 rotates, from the frame of reference of the disc 20 centrifugal force causes air to be forced through the filter 34 and the plenum chamber 46 through the bore 44 and onto the information carrier 52.

In further detail, assuming for purposes of explanation that the information carrier 52 is stationary, as the shaft 22 rotates, from the frame of reference of the information carrier 52, all portions of the disc 20 are accelerated toward the axis 24 in order to maintain the circular motion of the disc 20. Since the frictional or binding forces between the disc 20 and the air within the channel 40 are minimal, as the disc 20 rotates the air within the channel 40 is accelerated at a lower rate than is the disc 20, thereby causing a pressure differential between the filter chamber 48 and the end of the bore 44 adjacent to the information carrier 52. This pressure differential causes air to flow from a higher pressure area to a lower pressure area. In this case, the lower pressure area is the end of the bore 44 adjacent to the information carrier 52.

If desired either the plenum chamber 46 or the filter chamber 48 or both may be eliminated by extending the bore 44 from the second planar surface 50 to the first planar surface 42. As previously stated, the filter 34 filters the air prior to its exit onto the information carrier 52. The plenum chamber 46 operates to increase the flow of air through the bore 44.

Figure 3:
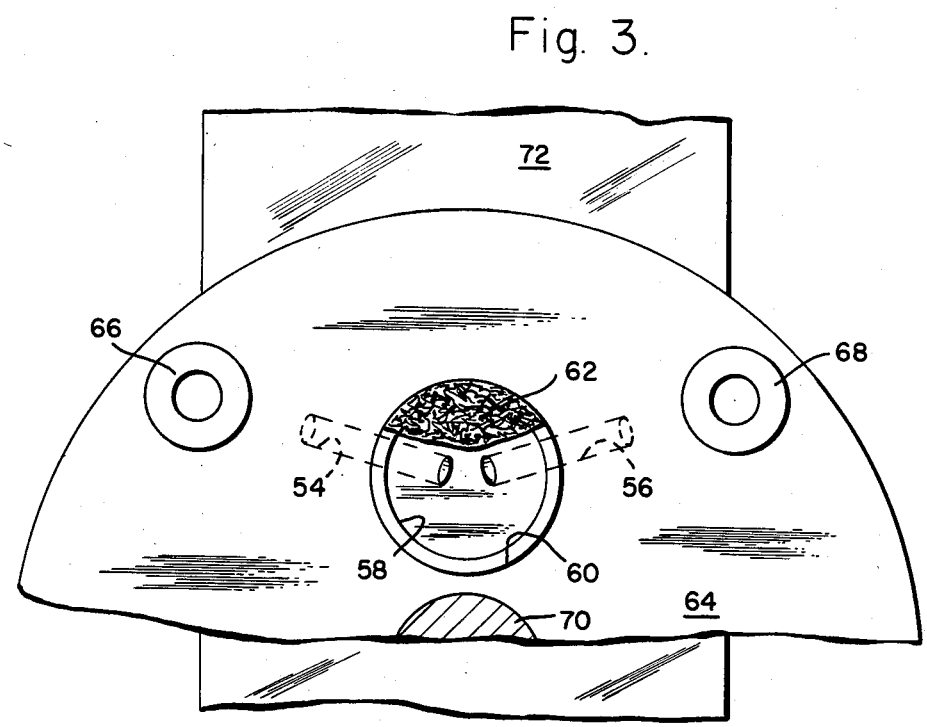
FIG. 3 is a fragmented top plan view of an alternative embodiment of the invention.

Alternatively, two bores may share a common filter, filter chamber and plenum chamber. As shown in FIG. 3, a pair of bores 54 and 56 communicate with a single plenum chamber 58, a single filter chamber 60 and a single filter 62 within a disc 64. The filter 62 is shown in a fragmented view to more clearly illustrate the configuration of the bores 54 and 56. The bores 54 and 56 each extend from the plenum chamber 58 through the disc 64 to areas adjacent to optical beam focusing means 66 and 68 respectively. In the same manner a with the embodiment of FIGS. 1 and 2, as a shaft 70 rotates about its axis, to thereby cause the disc 64 to rotate, centrifugal force causes air to flow through the filter 62, the filter chamber 60, the plenum chamber 58 through the bores 54 and 56 and onto an information carrier 72 to thereby force dust particles from the information carrier 72.

Furthermore, the rotating structure need not be in the form of a disc but could be any rotating member having the required channel. For example, a single rotating arm could be utilized. In addition, instead of lens assemblies as shown in the preferred embodiment, optical transducers, magnetic transducers, capacitive transducers, mirrors or any suitable information handling elements could be utilized.

It is to be understood that the subject invention has been described by reference to specific embodiments and that many additions and modifications thereto will be apparent to those skilled in the art. Accordingly, the foregoing description is not to be construed in a limiting sense.

I claim:

1. An apparatus for removing dust from an information carrier comprising:
    a disc having at least one channel, each channel extending from a first planar surface of the disc to a second planar surface of the disc such that the distance from the intersection of each channel and the first planar surface to the axis of rotation of the disc is less than the distance from the intersection of each channel and the second planar surface to the axis of rotation of the disc; and
    means for rotating the disc relative to the information carrier, about the axis with the second planar surface adjacent to the information carrier, to thereby cause air to flow through the channel onto the information carrier.

2. The apparatus of claim 1 wherein the disc further comprises optical beam directing means operative to transmit light from a radiation source to the information carrier.

3. The apparatus of claim 1 wherein the channels are positioned symmetrically within the disc.

4. The apparatus of claim 2 wherein the channels are positioned symmetrically within the disc.

5. The apparatus of claim 2 wherein the optical beam directing means comprises at least one lens assembly.

6. The apparatus of claim 3 wherein the optical beam directing means comprises at least one lens assembly.

7. The apparatus of claim 4 wherein the optical beam directing means comprises at least one lens assembly.

8. The apparatus of claim 5 wherein the number of lens assemblies is equal to the number of channels.

9. The apparatus of claim 1, further comprising:
    filter means for filtering the air prior to its discharge from each channel onto the information carrier.

10. The apparatus of claim 9 wherein the filter means further comprises:
    filtering media within the end of the channel adjacent to the first planar surface of the disc.

11. The apparatus of claim 10 wherein the cross-sectional area of the channel containing the filtering media is larger than the cross-sectional area of the channel adjacent to the second planar surface.

12. The apparatus of claim 1 wherein the cross-sectional area of the channel adjacent to the first planar surface of the disc is larger than the cross-sectional area of the end of the channel adjacent to the second planar surface.

13. The apparatus of claim 12 further comprising filter means within the channel operative to filter the air prior to its discharge onto the information carrier.

14. An apparatus for removing dust from an information carrier comprising:
    a rotating member having at least one channel, each channel extending from a first side of the rotating member to a second side of the rotating member, the second side of the member being adjacent to the information carrier during at least a portion of the period of rotation of the rotating member relative to the information carrier for scanning the information carrier, the intersection of each channel and the second side having a distance from an axis about which the rotating member rotates greater than the distance from the intersection of the channel and the first side to the axis; and
    optical beam directing means mounted to the rotating member for directing an optical beam onto the information carrier.

15. The apparatus of claim 14 wherein the channels are positioned symmetrically about the rotating member.

16. The apparatus of claim 14 wherein the optical beam directing means comprises lens assemblies each having at least one lens, the lens assemblies being positioned symmetrically about the rotating member.

17. The apparatus of claim 15 wherein the optical beam directing means comprises lens assemblies each having at least one lens, the lens assemblies being positioned symmetrically about the rotating member.

18. The apparatus of claim 14 wherein the number of lens assemblies is equal to the number of channels.

19. The apparatus of claim 14 further comprising:
filter means for filtering the air prior to its discharge from each channel onto the information carrier.

20. The apparatus of claim 19 wherein the filter means further comprises:
filtering media within the end of the channel adjacent to the first side of the rotating member.

21. The apparatus of claim 20 wherein the cross-sectional area of the end of the channel containing the filtering media is larger than the cross-sectional area of the end of the channel adjacent to the second side of the rotating member.

22. The apparatus of claim 14 wherein the cross-sectional area of the end of the channel adjacent to the first side of the rotating member is larger than the cross-sectional area of the end of the channel adjacent to the second side of the rotating member.

23. The apparatus of claim 22 wherein the apparatus further comprises:
filter means within the channel operative to filter the air prior to its discharge onto the information carrier.

24. An apparatus for removing dust from an information carrier comprising:
a rotating member having at least one channel, each channel extending from a first side of the rotating member to a second side of the rotating member, the second side of the member being adjacent to the information carrier during at least a portion of the period of rotation of the rotating member relative to the information carrier for scanning the information carrier, the intersection of each channel and the second side having a distance from an axis about which the rotation member rotates, greater than the distance from the intersection of each channel and the first side to the axis: and
at least one information handling element mounted on the rotating member.

25. The apparatus of claim 24 wherein the channels are positioned symmetrically about the rotating member.

26. The apparatus of claim 24 wherein the information handling element is positioned symmetrically about the rotating member.

27. The apparatus of claim 25 wherein the information handling element is positioned symmetrically about the rotating member.

28. The apparatus of claim 24 wherein the number of information handling elements is equal to the number of channels.

29. The apparatus of claim 24 further comprising:
filtering means for filtering air prior to its discharge from each channel onto the information carrier.

30. The apparatus of claim 29 wherein the filter means further comprises:
filtering media with the end of the channel adjacent to the first side of the rotating member.

31. The apparatus of claim 30 wherein the cross-sectional area of the end of the channel containing the filtering media is larger than the cross-sectional area of the end of the channel adjacent to the second side of the rotating member.

32. The apparatus of claim 24 wherein the cross-sectional area of the end of the channel adjacent to the first side of the rotating member is larger than the cross-sectional area of the end of the channel adjacent to the second side.

33. The apparatus of claim 32 further comprising:
filter means within the channel operative to filter the air prior to its discharge onto the information carrier.

34. A method of removing dust from an information carrier during playback of the information carrier comprising the steps of:
providing at least one channel which extends from a first planar surface of a disc to a second planar surface of a disc, the second planar surface being adjacent to the information carrier, the intersection of each channel and the second planar surface having a distance from an axis about which the disc rotates greater than the distance from the intersection of the channel and the first planar surface to the axis;
providing optical beam directing means mounted to the disc; and
rotating the disc about the axis and relative to the information carrier.

35. A method of removing dust from an information carrier during recording onto the information carrier comprising the steps of:
providing at least one channel which extends from a first planar surface of a disc to a second planar surface of a disc, the second planar surface being adjacent to the information carrier, the intersection of each channel and the second planar surface having a distance from an axis about which the disc rotates greater than the distance from the intersection of the channel and the first planar surface to the axis;
providing optical beam directing means mounted to the disc; and
rotating the disc about the axis and relative to the information carrier.

36. A method of removing dust from an information carrier during playback of the information carrier comprising the steps of:
providing at least one channel which extends from a first side of a member to a second side of a member, the second side of the member being adjacent to the information carrier during at least a portion of the period of rotation of the member, the intersection of each channel and the second side having a distance from an axis about which the member rotates greater than the distance from the intersection of the channel and the first side to the axis;
providing optical beam directing mean mounted to the member; and
rotating the member about the axis and relative to the information carrier.

37. A method of removing dust from an information carrier during recording onto the information carrier comprising the steps of:
providing at least one channel which extends from a first side of a member to a second side of a member, the second side of the member being adjacent to the information carrier during at least a portion of the period of rotation of the member, the intersection of each channel and the second side having a distance from an axis about which the member rotates greater than the distance from the intersection of the channel and the first side to the axis;

providing optical beam directing means mounted to the member; and rotating the member about the axis and relative to the information carrier.

38. A method of removing dust from an information carrier during playback of the information carrier comprising the steps of:

providing at least one channel which extends from a first side of a member to a second side of a member, the second side of the member being adjacent to the information carrier during at least a portion of the period of rotation of the member, the intersection of each channel and the second side having a distance from an axis about which the member rotates greater than the distance from the intersection of the channel and the first side to the axis;

providing at least one information handling element mounted to the member; and rotating the member about the axis and relative to the information carrier.

39. A method of removing dust from an information carrier during recording onto the information carrier comprising the steps of:

providing at least one channel which extends from a first side of a member to a second side of a member, the second side of the member being adjacent to the information carrier during at least a portion of the period of rotation of the member, the intersection of each channel and the second side having a distance from an axis about which the member rotates greater than the distance from the intersection of the channel and the first side to the axis;

providing at least one information handling element mounted to the member; and rotating the member about the axis and relative to the information carrier.

* * * * *